United States Patent [19]

Marzocchi et al.

[11] 4,332,704
[45] Jun. 1, 1982

[54] MODIFIED ASPHALT COMPOSITIONS

[75] Inventors: Alfred Marzocchi; Michael G. Roberts; Charles E. Bolen; Edward R. Harrington, all of Newark, Ohio

[73] Assignee: Owens-Corning Fiberglas Corporation, Toledo, Ohio

[21] Appl. No.: 158,966

[22] Filed: Jun. 12, 1980

[51] Int. Cl.$^3$ ............................................. C08L 91/00
[52] U.S. Cl. .................... 523/203; 428/428; 428/430; 428/431; 523/213; 523/214; 527/500
[58] Field of Search ......................... 260/28 R, 40 R; 428/428, 430, 431

[56] References Cited

U.S. PATENT DOCUMENTS

| | | | |
|---|---|---|---|
| 2,701,777 | 2/1955 | Farris | 117/126 |
| 2,877,129 | 3/1959 | Hardman | 106/279 |
| 3,349,051 | 10/1967 | Alexander et al. | 260/285 |
| 3,483,153 | 12/1969 | Pitchford | 260/285 |
| 3,864,203 | 2/1975 | Marzocchi | 428/384 |

OTHER PUBLICATIONS

L. Ciplijauskas, Ind. Eng. Chem. Prod. Res. Dev., vol. 18, No. 2, pp. 86–88, Jun. 1979.

*Primary Examiner*—Melvyn I. Marquis
*Attorney, Agent, or Firm*—Ronald C. Hudgens; Robert F. Rywalski; Keith V. Rockey

[57] ABSTRACT

A chemically-modified asphalt composition formed by reaction of an asphalt, a polycarboxylic acid or anhydride and an organic polyalcohol. The resulting polyester-modified asphalt composition can be cross linked using a vulcanizing agent to form hard rigid bodies which can be reinforced with reinforcements and/or fillers, notably including glass fibers.

11 Claims, No Drawings

MODIFIED ASPHALT COMPOSITIONS

This invention relates to chemically modified asphalt compositions, and more specifically to asphalt compositions which have been chemically modified with a polyester resin to impart increased rigidity to the asphalt and to promote compatibility between the asphalt and reinforcements therefor.

As is well known to those skilled in the art, asphalt is a bituminous material which contains bitumens occurring in nature or bitumens obtained as the residue in the refining of petroleum. Generally, asphalt is made up of condensed hydrocarbon rings which contain various reactive groups, and notably carbon-to-carbon double bonds as well as hydroxy groups, carboxy groups and like functional groups. In terms of distribution, asphalt is much like a plastisol in that it is formed of graphitic particles suspended in a viscous liquid. The particles are of the same chemical type, but differ each from the other primarily in molecular weight. Thus, the liquid phase of the asphalt is formed predominantly of lower molecular weight condensed hydrocarbon rings, whereas the graphitic particles suspended therein are made up of high molecular weight condensed hydrocarbon rings.

Asphalt has been used for many years in road-paving applications, as well as many other uses calling for strong, inert physical and chemical properties, including applications in roofing and the like. Perhaps the most extensive field of use for asphalt now resides in road paving applications in which the asphalt is modified with fillers, and specifically glass fibers and/or glass flake which are combined with the asphalt or asphalt plus aggregate to increase the strength and wear resistance of road pavements.

One of the difficulties, however, in combining glass, either in the form of glass fibers or in the form of fragments of glass, such as glass flake, stems from the fact that the glass is highly hydrophilic in nature. Asphalt, on the other hand, is a highly hydrophobic material, derived as it is from petroleum. Thus, there exists a basic incompatability between glass and asphalt by reason of the chemical nature of each of them. For that reason it has been difficult to establish any bond, either physical or chemical, between asphalt and glass fillers and/or reinforcements.

One of the other advantages of asphalt stems from the fact that it is a tough material which is, for the most part, highly inert chemically. Thus asphalt has numerous desirable characteristics from the standpoint of use in the manufacture of moldable structural members, but for one significant drawback. That is, that asphalt tends to be tacky, and hence unsuitable for use in the manufacture of such structural members.

It is known, as is described in U.S. Pat. No. 4,008,095, that asphalt can be modified by blending with various materials including coal or synthetic elastomers and petroleum resins. One of the difficulties with the techniques of the sort described in that patent arise from the fact that the resulting blend of asphalt with an elastomeric or resinous modifying agent is not homogeneous, with the result that there is a tendency for the modifying agent to separate from the asphalt. Without limitation as to theory, it is believed that the reason for such separation arises from the fact that resinous modifying agents are not chemically bonded to the asphalt. As a result, it is difficult to obtain a homogeneous system by simply blending a modifying agent with the asphalt. That difficulty is compounded when it is desired to reinforce asphalt systems with fillers such as glass fibers and/or glass flake; such reinforcing fillers seem to promote separation of the various components with the asphalt system.

It is accordingly an objective of this invention to provide a chemically modified asphalt system which overcomes the disadvantages described above.

It is a more specific objective of the invention to provide a chemically modified asphalt wherein the asphalt molecules are chemically combined with a polyester resin to thereby improve the rigidity of the resulting modified asphalt, to reduce its tackiness and to provide in the chemically modified asphalt reaction sites to facilitate the bonding of the chemically modified asphalt to reinforcements therefor, including glass fibers and/or glass flake.

The concepts of this invention reside in a chemically modified asphalt composition wherein the asphalt is reacted with a polyester resin formed in situ, preferably by reacting the asphalt first with a polycarboxylic acid or anhydride followed by a reaction of the product with a polyester-forming polyalcohol. Without limiting the invention as to theory, it is believed that the polycarboxylic acid or anhydride is reactive with functional groups in the asphalt itself and thereby serves to couple, by means of chemical bonds, the polyester resin ultimately formed to the asphalt. The resulting chemically modified asphalt can thus be cross linked through the use of a suitable cross-linking agent and preferably a vulcanizing agent.

The polyester resin thus introduced to the asphalt system, chemically bonded thereto, can serve as a source of reaction sites to establish a secure chemical bond between the chemically modified asphalt and reinforcing fillers such as glass, asbestos or organic fibers (in the form of strands, mats, woven and non-woven fabrics, etc.), siliceous aggregate, glass flake or combinations thereof blended with the chemically modified asphalt in reinforced asphalt systems. In addition, the cross linking of the chemically modified asphalt virtually eliminates the tacky characteristics common to most asphalts and facilitates the use of the resulting chemically modified asphalt as a moldable material for use in the manufacture of structural members.

In the practice of the invention, use is made of an asphalt in the form of ordinary asphalt or an asphalt which has been modified by reaction in the presence of air (e.g., blown asphalt), steam, ammonia or organic amines as described in application Ser. No. 852,772, filed Nov. 18, 1977 and now abandoned.

As to the polycarboxylic acid or anhydride, use is made of an organic acid or anhydride containing 2 to 235 carbon atoms and 2 to 4 carboxyl groups, when the material is in the acid form. Preferred are acids having the general formula:

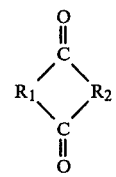

wherein $R_1$ is a divalent organic group containing 1 to 25 carbon atoms, including an alkenylene or an arylene group and $R_2$ is O or a pair of OH groups, each of which is bonded to the carboxyl groups when the compound is in an acid form. Examples of suitable carboxylic acids and anhydrides include oxalic acid, malonic acid, succinic acid, glutaric acid, maleic anhydride, glutaconic acid, adipic acid, suberic acid, 1,2,3-propene tricarboxylic acid, phthalic acid, terephthalic acid, terephthalic anhydride, 1,3,5-benzene tricarboxylic acid naphthalic acid, 3,5-pyridine dicarboxylic acid, 3,4-quinoline dicarboxylic acid, etc. Maleic anhydride is preferred.

As to the polyalchol, use is made of an organic, polyester-forming polyalcohol containing 2 to 20 carbon atoms and 2 to 4 hydroxyl groups. In general, such polyalcohols have the general formula:

$$HO-R_3-OH$$

where $R_3$ is a divalent group containing 2 to 20 carbon atoms. $R_3$ thus can be an alkylene group, or an alkenylene group. In addition, $R_3$ can be an alkyleneoxyalkylene group such as those derived from glycols. Preferred polyalcohols include ethylene glycol, diethylene glycol, triethylene glycol, glycerol and a variety of other polyalcohols conventionally used in the preparation of polyesters.

Relative proportions of the acid or anhydride and polyalcohol relative to the asphalt are not critical, and can be varied within the generally cited ranges. Best results are usually achieved when the weight of the acid or anhydride is within the range of 5 to 200 percent by weight based on the weight of the asphalt, and the alcohol is correspondingly used in an amount such that the total molar ratio of alcohol is within the range of 0.5 to 1.5 based upon the moles of acid employed. In general, the proportions of the acid or anhydride and polyalcohol is such that the polyester thus formed in situ is present in an amount sufficient to impart rigidity and non-tackiness to the resulting chemically modified asphalt composition.

In the preferred practice of the invention, it has been found that no catalyst is necessary to form the desired reaction product, it being sufficient that the asphalt be heated in the presence of the acid or anhydride followed by the addition of the polyalcohol. Reaction temperatures within the range of 100° to 400° F. are generally employed, with higher reaction temperatures favoring more rapid reaction rates. If desired, the asphalt can be, prior to reaction, dissolved in an inert organic solvent such as an aromatic solvent, although the solvent is unnecessary. It is frequently possible to carry out the reaction under non-oxidizing conditions to avoid any combustion of the asphalt; use of a vacuum of inert gas in the reaction vessel can be used for that purpose, although it is not necessary.

In accordance with one embodiment of the invention, it has been found that the polyester-modified asphalt of the present invention can be subjected to curing and/or cross linking by means of conventional vulcanizing agents. The fact of cross linking or curing the resulting polyester-modified asphalt composition is to cause the composition to become rigid and completely non-tacky. For this purpose, use can be made of conventional vulcanizing agents of the sort used as vulcanizers for natural rubbers as well as synthetic butadiene rubbers. Representative vulcanizing agents include sulfur, sulfur monochloride, selinium, tellurium, thiuram disulfides, p-quinone dioximes, polysulfite polymers, zinc oxide, magnesium oxide, etc. Such vulcanizing agents can be used either alone or in combination with accelerators conventionally used to increase the rate of cure or vulcanization of rubbers. Representative accelerators which may be used in the practice of this invention include aldehyde amines, thiocarbamates, thiuram sulfides, guanidines, thiazoles as well as a host of other conventional accelerators.

The amount of the vulcanizing and/or accelerator employed in the practice of this invention is not critical and can be varied within relatively wide limits. As a general rule, the amount of the vulcanizing agent employed is an amount sufficient to effect cure and/or cross linking of the polyester resin-modified asphalt, and the amount of the accelerator employed, if any, is an amount sufficient to accelerate the rate of cure and/or vulcanization of the modified asphalt composition of the invention. Generally, best results are usually achieved when the amount of the vulcanizing agent ranges from 1 to 20% based on the weight of the polyester-modified asphalt composition.

The asphalt compositions of this invention wherein asphalt has been chemically-modified with a polyester resin can be used in a variety of applications. For example, the asphalt compositions of the invention are highly suitable for use in road-paving applications, and particularly road-paving applications wherein the asphalt is reinforced with glass, either in the form of glass fibers or in the form of glass frit or flake.

It has been found, for example, that the bonding relationship between the glass fibers and the polyester-modified asphalt can be facilitated where the glass has been treated with an organo silane anchoring agent of the type conventionally used in the treatment of glass fibers for use in the reinforcement of elastomeric materials. Without limiting the present invention as to theory, it is believed that such organo silanes as well as their corresponding silanols and siloxanes, become chemically bonded to the glass surfaces, thus leaving free for reaction with the polyester resin the functional group attached to the silane. Considering as illustrative, gamma-aminopropyltriethoxysilane the amine group is thus available for reaction with functional groups with the polyester resin portion of the asphalt to thereby form a chemical bond between the resin-modified asphalt and the glass fibers combined therewith.

Because the asphalt compositions of this invention are rigid materials on curing, the asphalt compositions of this invention can also be used to the manufacture of molded products, and particularly molded products in which glass fibers are employed as reinforcement. Thus, the asphalt composition of this invention forms a continuous phase in which the glass fibers, preferably glass fibers containing a thin film coating of an organo silicon compounds as an anchoring agent, are distributed as reinforcement.

As used herein, the term "anchoring agent" refers to a number of organo silicon compounds well known to those skilled in the art which can be used to anchor the chemically-modified asphalt composition to glass, and preferably glass fibers, to promote a secure bonding relationship therebetween. In general, such organo silicon compounds include organo silanes containing 1–3 readily hydrolyzable groups and at least one organic group bonded directly to the silicon atom, which the organic group being substituted by one or more functional groups including an amino group, a mercapto group, a hydroxy group, a glycidoxy group, a carboxy group, an amide group, etc. Also included are organo silanes in which the organic group bonded directly to the silicon atom is unsaturated, such as a vinyl group, allyl group and the like. In addition to the silanes described above, use can also be made of compounds in their hydrolyzed form, that is the corresponding silanols or polysiloxane polymers. Such silanes are described in detail in, for example, U.S. Pat. No. 3,864,203.

In accordance with this concept of the invention, the organo silicon compound, and particularly the functional group contained in it, is capable of establishing a secure chemical bond between the chemically-modified asphalt composition of the invention and glass surfaces. Considering, for example, gamma-aminopropyltriethoxysilane as an example, glass fibers which have been coated, preferably in forming, with a size composition containing gamma-aminopropyltriethoxysilane, contain on the glass fiber surfaces the silane bonded directly to the glass as schematically illustrated below:

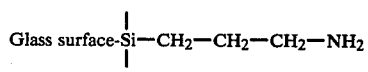

When such glass fibers are used as reinforcement for asphalt compositions of this invention, the free amino group which is chemically bonded directly to the glass fiber surfaces is capable of reaction with, for example, free carboxy groups or anhydride groups contained in the asphalt by reason of the reaction with the acid or anhydride with the asphalt. This reaction may be illustrated by way of the following:

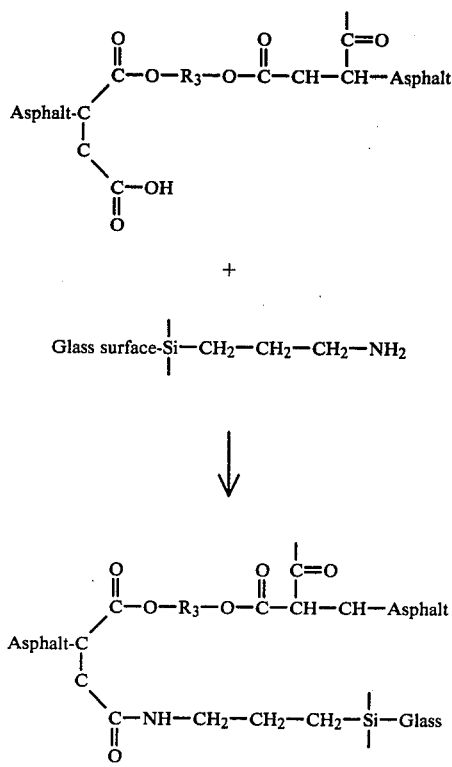

As can be seen from the foregoing, the polyester can serve to bond together portions of the asphalt composition, and still leave free carboxy groups for reaction with the functional group on the silane to thereby securely bond the glass fiber surfaces to the asphalt with which the glass fibers are combined as reinforcement.

Having described the basic concepts of the present invention, reference is now made to the following examples, which are provided by way of illustration and not by way of limitation of the practice of this invention in the preparation and use of asphalt compositions embodying the features of the invention.

EXAMPLE 1

This example illustrates the preparation of a polyester-modified asphalt composition embodying the concepts of this invention and its cure using sulfur as a vulcanizing agent.

A sample of 400 parts by weight of asphalt is placed into a resin pot and heated to 110° C. as the resin pot is flushed with nitrogen. Then, 300 parts by weight of maleic anhydride are added, and the mixture is stirred under nitrogen gas; the temperature is raised to 200° C. for 3 hours. The temperature is then lowered to 80° C., and 324.64 parts by weight of diethylene glycol are added, as the temperature was slowly raised to 150° C. The mixture is then stirred overnight under a nitrogen blanket.

A 50 g sample of the foregoing asphalt-polyester copolymer is placed into a resin pot and heated to 140° C. Thereafter, 5 parts by weight of sulfur are added, and the resulting mixture stirred at 140° C. for 96 hours.

The resulting polyester-modified asphalt is very hard and brittle.

EXAMPLE 2

Using the procedure of Example 1, a sample of 400 parts by weight of asphalt is reacted with 250 parts by weight of terephthalic anhydride. After about 4 hours of reaction, triethylene glycol is added to the reaction and the temperature slowly raised to facilitate the reaction to form the polyester resin in situ.

The resulting polyester-modified asphalt, a highly viscous material, is then molded with glass fibers which have been coated in forming with the thin size film coating containing gamma-aminopropyltriethoxysilane. Once molded into the desired configuration, the reinforced polyester-modified asphalt can be rendered hard and non-tacky by curing with a vulcanizing agent, and preferably sulfur.

It will be understood that various changes and modifications can be made in the details of procedure, formulation and use without departing from the spirit of the invention, especially as defined in the following claims.

We claim:

1. A chemically-modified asphalt composition formed by reaction of (a) an asphalt, (b) a polycarboxylic acid or anhydride containing 2 to 4 carboxyl groups and (c) an organic polyalcohol.

2. A composition as defined in claim 1 wherein the acid or anhydride is an organic acid or anhydride containing 2 to 25 carbon atoms and containing ethylenic unsaturation.

3. A composition as defined in claim 1 wherein the polyalcohol contains 2 to 20 carbon atoms and 2 to 4 hydroxyl groups.

4. A composition as defined in claim 1 wherein the composition has been cured with a vulcanizing agent.

5. A composition as defined in claim 1 wherein the asphalt is first reacted with the acid or anhydride and the resulting product is reacted with the polyalcohol.

6. A composition as defined in claim 1 wherein the acid or anhydride reacted is an amount within the range of 5 to 200% by weight based on the weight of the asphalt.

7. A reinforced composite comprising a chemically-modified asphalt as defined in claim 1 as a continuous phase, and a reinforcing filler distributed throughout the continuous phase as reinforcement therefor.

8. A composite as defined in claim 7 wherein the filler is formed of glass fibers.

9. A composite as defined in claim 8 wherein the glass fibers contained on the surfaces thereof comprise a thin size coating containing an organo silicon compound as an anchoring agent.

10. A composite as defined in claim 7 wherein the chemically-modified asphalt is cured.

11. A method for preparing a chemically-modified asphalt composition comprising the steps of reacting an asphalt with polycarboxylic acid or anhydride, and then reacting an organic polyalcohol with the reaction product to form a polyester-modified asphalt composition.

* * * * *